United States Patent
Bakshi

(10) Patent No.: US 7,668,121 B2
(45) Date of Patent: Feb. 23, 2010

(54) PURGING OF AUTHENTICATION KEY CONTEXTS BY BASE STATIONS ON HANDOFF

(75) Inventor: Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 11/329,912

(22) Filed: Jan. 10, 2006

(65) Prior Publication Data

US 2007/0160211 A1    Jul. 12, 2007

(51) Int. Cl.
H04K 1/00    (2006.01)

(52) U.S. Cl. .................. 370/272; 370/270; 370/271

(58) Field of Classification Search .............. 380/247, 380/270–273
See application file for complete search history.

(56) References Cited

U.S. PATENT DOCUMENTS

| | | | | |
|---|---|---|---|---|
| 6,141,566 | A * | 10/2000 | Gerdisch et al. | 455/562.1 |
| 7,155,222 | B1 * | 12/2006 | Jain et al. | 455/435.1 |
| 2002/0154776 | A1 * | 10/2002 | Sowa et al. | 380/247 |
| 2003/0080959 | A1 * | 5/2003 | Morein | 345/422 |
| 2003/0149666 | A1 | 8/2003 | Davies | |
| 2003/0157966 | A1 | 8/2003 | Sato et al. | |
| 2003/0226017 | A1 * | 12/2003 | Palekar et al. | 713/168 |
| 2006/0215695 | A1 * | 9/2006 | Olderdissen | 370/469 |
| 2007/0064647 | A1 * | 3/2007 | Prasad | 370/331 |
| 2007/0160211 | A1 | 7/2007 | Bakshi | |
| 2007/0165858 | A1 * | 7/2007 | Bakshi | 380/247 |

FOREIGN PATENT DOCUMENTS

| | | |
|---|---|---|
| EP | 1077579 A1 | 2/2001 |
| EP | 1 521 402 A2 | 4/2005 |
| EP | 1 705 939 A1 | 9/2006 |
| WO | WO00/30393 | 5/2000 |
| WO | WO 03096712 A1 * | 11/2003 |

OTHER PUBLICATIONS

Michel Barbeau, WiMax/802.16 Threat Analysis, Oct. 13, 2005, Q2Winet'05, pp. 8-15.*
David Johnston and Jesse Walker, Overview of IEEE 802.16 Security, Jun. 2004, IEEE Computer Society, vol. 2 issue 3 pp. 40-48.*
Anonymous, "Extract from: IEEE P802.16e/D12, Draft IEEE Standard for Local and metropolitan area networks, Part 16: Air Interface for Fixed and Mobile Broadband Wireless Access Systems," Oct. 14, 2005, pp. 186-260, XP002435176.
Harkins, Dan, "Caching PMKs," IEEE 802.11-03/421r0 Submission, May 2003, pp. 1-8, XP002435177.
International Search Report for International Application No. PCT/US2007/000808, issued by the European Patent Office on Jun. 12, 2007, pp. 1-6.
International Search Report for International Application No. PCT/US2007/000820 issued by the European Patent Office on May 16, 2007, pp. 1-5.

* cited by examiner

*Primary Examiner*—Kambiz Zand
*Assistant Examiner*—Brian Olion
(74) *Attorney, Agent, or Firm*—Schwabe, Williamson & Wyatt, P.C.

(57) ABSTRACT

Various embodiments of methods and apparatuses for managing authentication key contexts are described herein. In various embodiments, the methods and apparatuses include purging an authentication key context of a supplicant after handing off the supplicant, even the authentication key has not expired.

9 Claims, 4 Drawing Sheets

PURGING OF AUTHENTICATION KEY CONTEXTS BY BASE STATIONS ON HANDOFF

BACKGROUND

1. Technical Field

Embodiments of the present invention are related to the fields of data processing and data communication, and in particular, to wireless networking.

2. Description of Related Art

An Institute of Electrical and Electronic Engineers (IEEE) 802.11e standard (approved 2005, IEEE Standards Board, Piscataway, N.Y.), among other things, define aspects of Worldwide Inoperability for Microwave Access (WiMAX) for Wireless Metropolitan Area Networks (MANs). Under WiMAX, uplink and downlink control media access control (MAC) messages are cryptographically signed in order to protect against replay attacks. For the purpose of signing MAC messages, an authentication key (AK) is generated at both the Mobile Subscriber Station (MSS) and Base Station (BS). From AK, both MSS and BS generate an Uplink MAC key and Downlink MAC key which are used for signing uplink and downlink MAC control messages respectively. In order to protect against replay attacks on MAC messages, associated with each AK is an Uplink Packet Number and a Downlink Packet Number that are stored as part of a AK Context and are used in computation for MAC message signing. The Uplink Packet Number is incremented whenever a new Uplink MAC message needs to be sent by the MS. Similarly, the Downlink Packet Number is incremented whenever a new Downlink MAC message needs to be sent by the BS. The Uplink and Downlink Packet Number Counters have to be unique for each uplink and downlink MAC management message, otherwise a security hole is created and that allows replay attack.

Additionally, under WiMAX, a MSS can do a high speed handoff (HO) from one BS to another leading to creation of a new AK and AK context at MSS and the new BS. Since an AK can have a lifetime of several days, MSS and old BS are required to cache the AK and AK Context after MSS does handoff until that AK is valid. This ensures two things: a) when the MSS HO back to the old BS, correct AK and Uplink Packet Number and Downlink Packet Number are used i.e. starting for the value at least one more than just before the HO and b) avoiding the need to do lengthy authentication steps to generate new AK and AK Context whenever MSS does a HO. Since AKs can have a valid lifetime of several days, BSs have to cache a large number of AKs and AK Contexts belonging not only to MSSs currently active in the network but also MSS that had joined and left the network but still have valid AKs. This leads to potentially large memory requirements in BS and lengthy searches that are keyed by MSS, leading to a costly BS.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
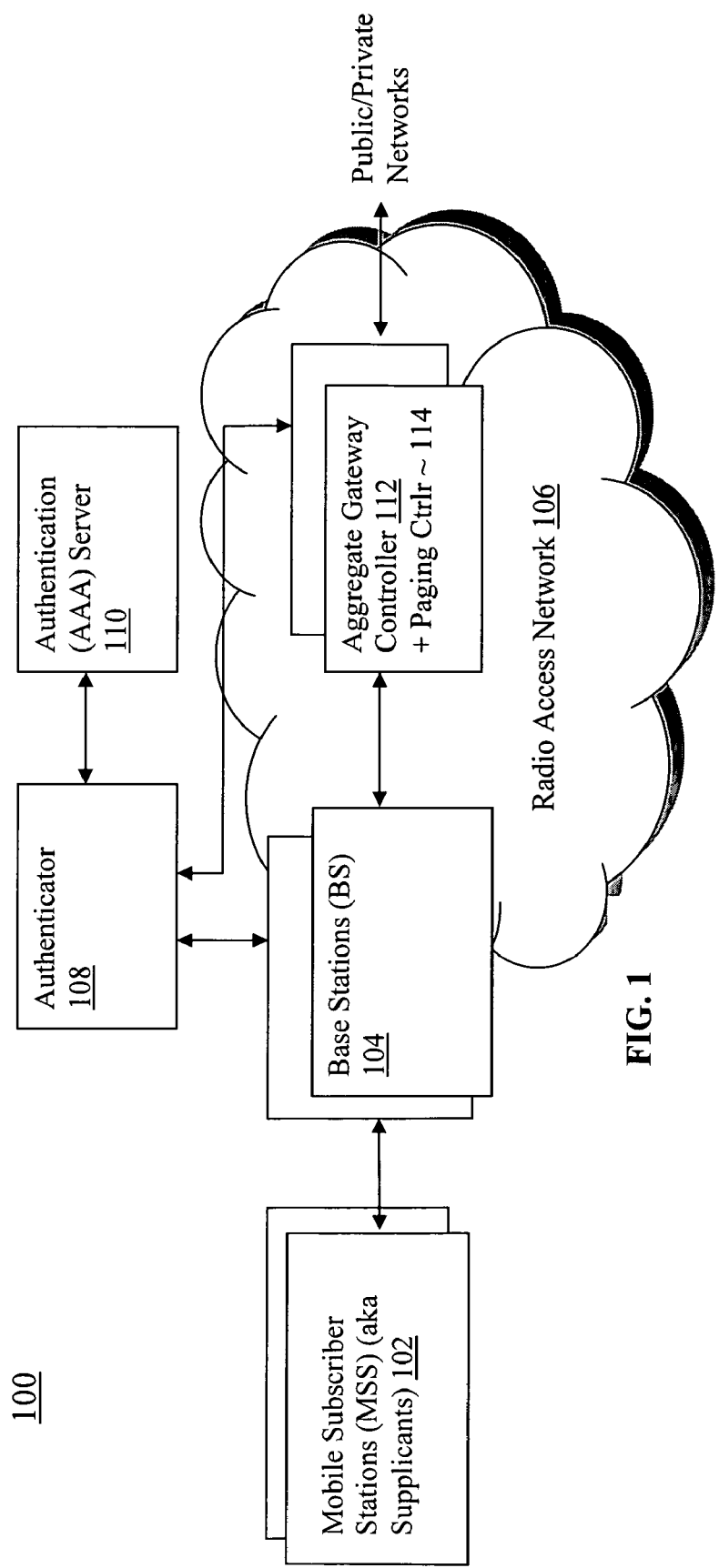
FIG. 1 illustrates a wireless MAN suitable for practicing the invention, in accordance with various embodiments.

With reference to FIG. 1, there is illustrated a wireless MAN 100, suitable for practice the present invention, in accordance various embodiments. While illustrative embodiments of the present invention will be described in the context of wireless MAN 100, the present invention is not so limited, it is anticipated that it may be practiced in any wide area networks (WAN) without regard to the size of the area covered by the networks, in particular, the size of the area covered by the network is not limited to the size of a typical metropolitan area. Embodiments of invention may also be practiced with wireless local area networks (WLAN).

For the embodiments, wireless MAN 100 includes a number of MSSs 102 communicatively coupled to BSs 104, which in turn are selectively coupled to a number of Aggregate Gateway Routers (AGR) 112, as shown. Each MSS 102 is coupled to Radio Access Network (RAN) 106 through one of the selected BSs 104 and AGR 112, to access various private and public networks, such as the Internet, after MSSs 102 have been authenticated as being eligible to access network 106.

In various embodiments, MSSs 102 may be a laptop computer, a personal computer, a portable hand-held computer, a personal digital assistant, or like device. In various embodiments, BSs 104 are geographically dispersed, with each BS 104 servicing MSSs 102 in its coverage area, in particular, implementing media access control (MAC) and radio physical layer (PHY) functions, and providing radio coverage for MSSs 102 in its coverage area.

In various embodiments, each AGR 112 services a number of BSs 104. Typically, each AGR 112 may be an IP router that hosts centralized control functions, including e.g. Paging Controller 114. The BSs 104 and AGRs 112 together define the RAN. The AGRs 112 connect the RAN to one or more IP core networks, providing connectivity to the private and public networks, such as the Internet.

In various embodiments, wireless MAN 100 further includes at least an Authenticator 108 and an authentication server 110, coupled to each other, BSs 104 and AGRs 112 as shown, to facilitate authentication of MSSs 102. In various embodiments, an Authenticators 108 of a MSS 102 and a BS 104 pair may be integrated with the BS 104.

In various embodiments, the authentication is based upon Internet Engineering Task Force (IETF)'s Extensible Authentication Protocol (EAP) 3-party model which consists of a "Supplicant", an "Authenticator" and an "Authentication Server". In alternate embodiments, other authentication protocols may be practiced. Under EAP, a Supplicant is an entity at one end of a point-to-point link, such as a MSS 102, that is being authenticated by an authenticator attached to the other end of that link, such as Authenticator 108. Authenticator 108 enforces authentication before allowing access to services that are accessible to the Supplicant. Authentication Server 110 provides authentication service to Authenticator 108. This service determines from the credentials provided by the Supplicant whether the Supplicant is authorized to access the services provided via the authenticator. An AAA backend server is an example of authentication server.

In order to establish end-to-end communications between Supplicant and Authentication server, the three-party model uses EAP, an encapsulation protocol, to transport the protocol data units (PDUs) related to the authentication method being used between Supplicant and Authentication Server across the network. Upon successful authentication, both Supplicant 102 and Authentication Server 110 generate mutual keying material (AK) representing the session. Authentication Server 110 transfers the generated key to the Authenticator 108 associated with the BS 104 via which MSS 102 is connected, so the MSS 102 is allowed into the network 106 and provided services per its subscription policy.

Further, the authentication includes Authenticator 108 creating and maintaining AK contexts of the AKs for the various MSS 102. Still further, to facilitate high speed HO of MSS 102 from one BS 104 to another 104, as MSS 102 moves from one coverage area to another, Authenticator 108 as well as BSs 104 cache the AK contexts of the various MSS 102. Moreover, each AK context includes an Uplink Packet Number (ULPN) and a Downlink Packet Number (DLPN) for computation performed for MAC message signing by a MSS 102, for communication with a BS 104. However, for the embodiments, BSs 104 can be configured to aggressively purge AK contexts, even before the corresponding AKs have expired, if the MSSs 102 disconnect from the BS(s) 104, thereby reducing the storage requirement of the BSs 104, and to reduce the search time for accessing AK contexts in the BS.

Figure 2:
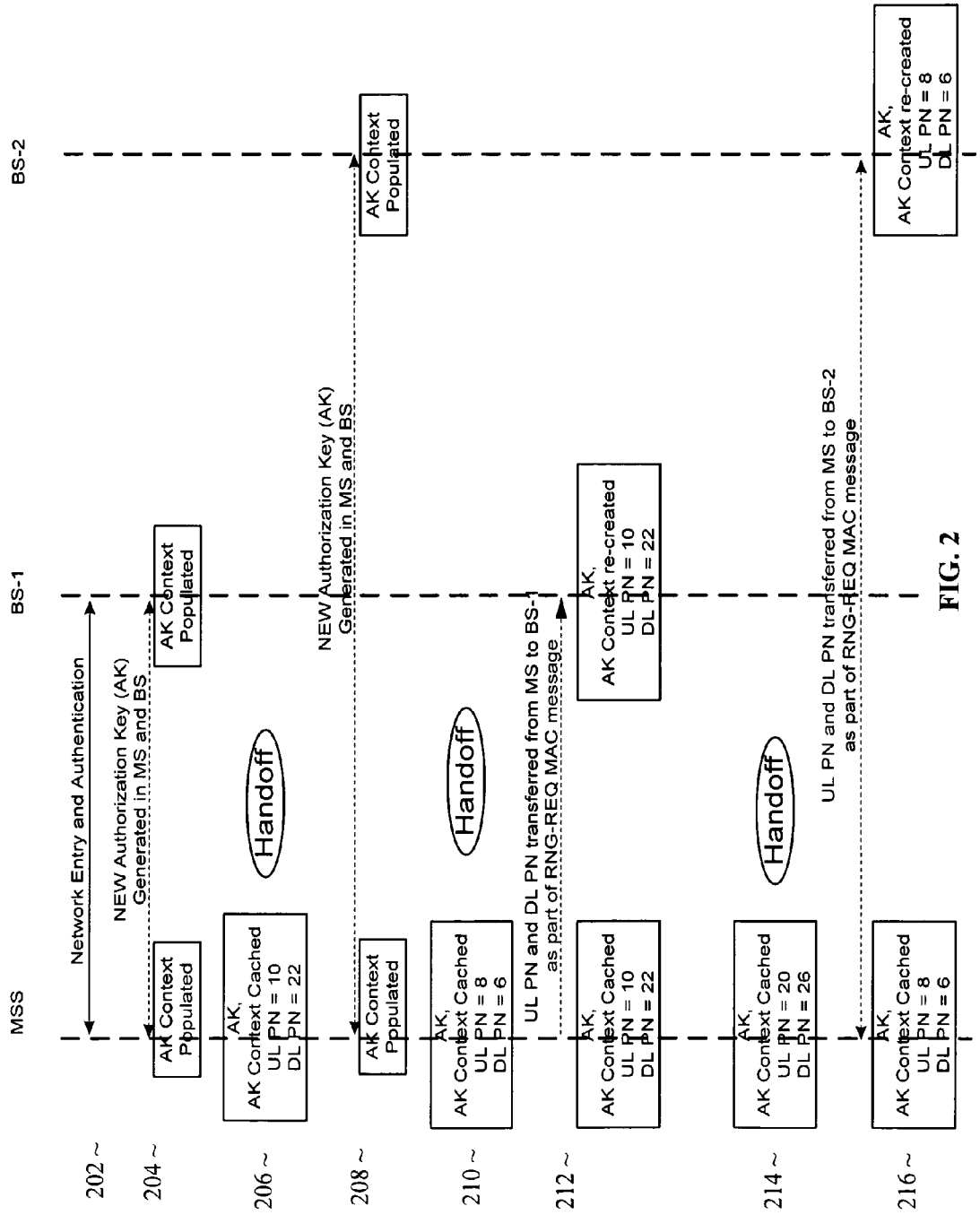
FIG. 2 illustrates HO in the wireless MAN of FIG. 1, in accordance with various embodiments.

FIG. 2 illustrates high speed HO in accordance with various embodiments in further detail. At 202, after initial network discovery, BS selection and authentication, the root cryptographic material required to generate AKs for all the BSs 104 in the network is populated/created in both the MSS 102 and in Authenticator 108 common to BSs 104 in the network. In various embodiments, all BSs 104 in the network request their AKs and AK Contexts from Authenticator 108.

At 204, from the cryptographic material generated in 202, both the MSS 102 and BS-1 104 generate a new AK and associated fresh AK context. Typically, when a fresh AK Context is generated, both the UL PN and the DL PN are initialized to a known value e.g. 1.

At 206, after exchanging several uplink and downlink MAC messages, a HO is triggered from BS-1 104 to BS-2 104. At this point both the MSS 102 and BS-1 104 cache the AK Context, with the values of UL PN (=10) and DL PN (=22).

At 208, during HO to BS-2 104, both the MSS 102 and BS-2 104 generate a new AK and associated fresh AK context. Typically, when a fresh AK Context is generated, both the UL PN and the DL PN are initialized to a known value e.g. 1.

Further, on HO to BS-2 104, BS-1 104 purges or deletes the AK Context corresponding to the AK of the handed off MSS 102. In various embodiments, each purging or deletion may comprise marking an AK context as invalid and/or marking storage locations of a storage medium employed to store the AK context being purged or deleted as available for use to store another AK context or even other unrelated data.

At 210, after exchanging several uplink and downlink MAC messages, a handoff is triggered from BS-2 104 to BS-1 104. At this point both the MSS 102 and BS-2 104 cache the AK Context with the values of UL PN (=8) and DL PN (=6).

At 212, during HO back to BS-1 104, MSS 102 verifies that it has a valid AK and associated AK context in its cache. Further, for the embodiments, as part of network entry upon handoff the MSS 102 sends a Range Request MAC message, including in it the UL PN (=10) and DL PN (=22) and signing the message with the uplink MAC key derived from AK. The BS-1 104 upon receiving the Range Request MAC message fetches the AK from Authenticator 108 and uses it to generate the MAC keys and verifies the Range Request MAC message from MSS 102. Upon successful verification, the BS-1 caches the received UL PN (=10) and DL PN (=22) and uses these during future exchanges of MAC message with the MSS 102.

Furthermore, similar to BS-1 104, on HO of MSS 102 to BS-1 104, BS-2 104 purges or deletes the AK Context corresponding to the AK of MSS 102.

At 214, after exchanging several uplink and downlink MAC messages, a HO is triggered from BS-1 104 to BS-2 104. At this point only the MSS caches the AK Context and specifically the values of UL PN (=20) and DL PN (=26). As before, BS-1 104 purges or deletes the AK Context corresponding to the AK of MSS 102.

At 216, during HO to BS-2, MSS verifies that it has a valid AK and associated AK context in its cache. As part of network entry upon HO, the MSS send a message, e.g. the 802.16e Range Request MAC message, including in it the UL PN (=8) and DL PN(=6) and signing the message with the uplink MAC key derived from AK. The BS-2 104 upon receiving the Range Request MAC message fetches the AK from Authenticator 108 and uses it to generate the MAC keys and verifies the Range Request MAC message from MSS 102. Upon successful verification, BS-2 104 caches the received UL PN (=8) and DL PN (=6) and uses these during future exchanges of MAC message with the MSS 102.

As before, on HO of MSS 102 to BS-2 104, BS-1 104 again purges or deletes the AK Context corresponding to the AK of the handed off MSS 102.

Figure 3:
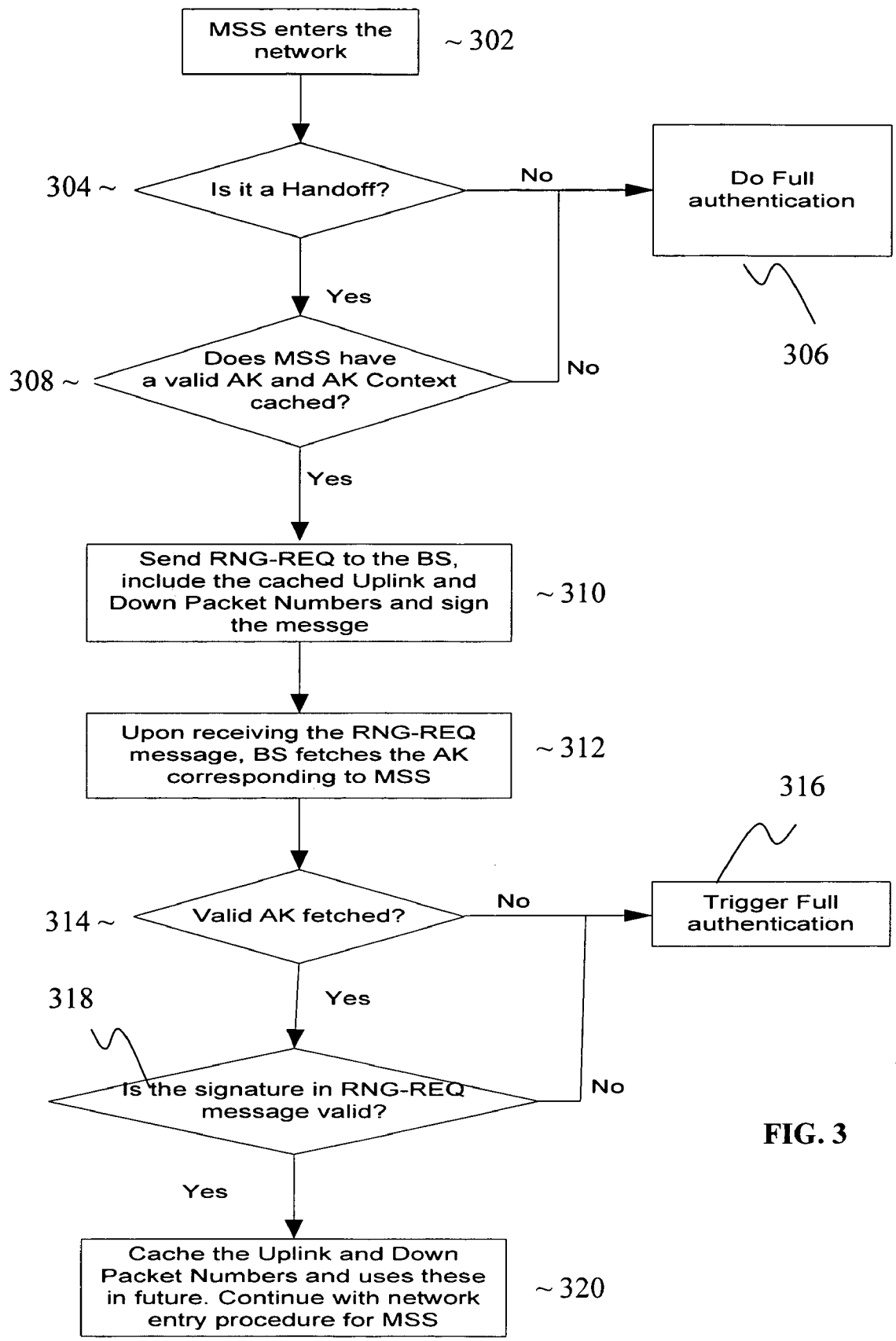
FIG. 3 illustrates a method of the present invention, wherein AK is not cached and is obtained on the fly and the associated context recreated dynamically when MS does HO to the BS, in accordance with various embodiments.

FIG. 3 illustrates another view of the method of the invention including aggressive purging of AK contexts in BSs, in accordance with various embodiments. As illustrated, for the embodiments, when a MSS 102 enters a coverage area of the network, 302, a BS 104 servicing the area determines if the entry of MSS 102 is a HO, 304. If the entry of MSS 102 is not a HO, a full authentication of MSS 102 is performed, 306.

However, if the entry of MSS 102 is a HO, MSS 102 would determine whether it has a valid AK and AK Context cached, 308. If it is determined that MSS 102 does not have a valid AK and AK Context cached, a full authentication of MSS 102 is also performed, 306. However, if it is determined that MSS 102 does have a valid AK and AK Context cached, MSS 102 sends a signed message, e.g. a Range Request MAC message, including the ULPN and DLPN, 310.

At 312, on receipt of the Range Request MAC message (RNG-REQ), BS 104 fetches the AK corresponding to the MSS 102, from Authenticator 108. At 314, BS 104 determines if a valid AK was successfully fetched. If not, as before, a full authentication is triggered, 316. However, if a valid AK was successfully fetched, BS 104 further determines whether the signature for RNG-REQ is valid, 318. If the signature for RNG-REQ is not valid, again, full authentication is triggered, 316. On the other hand, if the signature for RNG-REQ is valid, BS 104 caches the ULPN and DLPN and uses these in the future for message exchanges with MSS 102, 320.

Thus, in various embodiments, BS 104 effectively recreates the AK Contexts, including the ULPN and DLPN, when a MSS 102 is handed back to BS 104, thereby allowing BS 104 to aggressively purge the AK contexts on handoffs.

Figure 4:
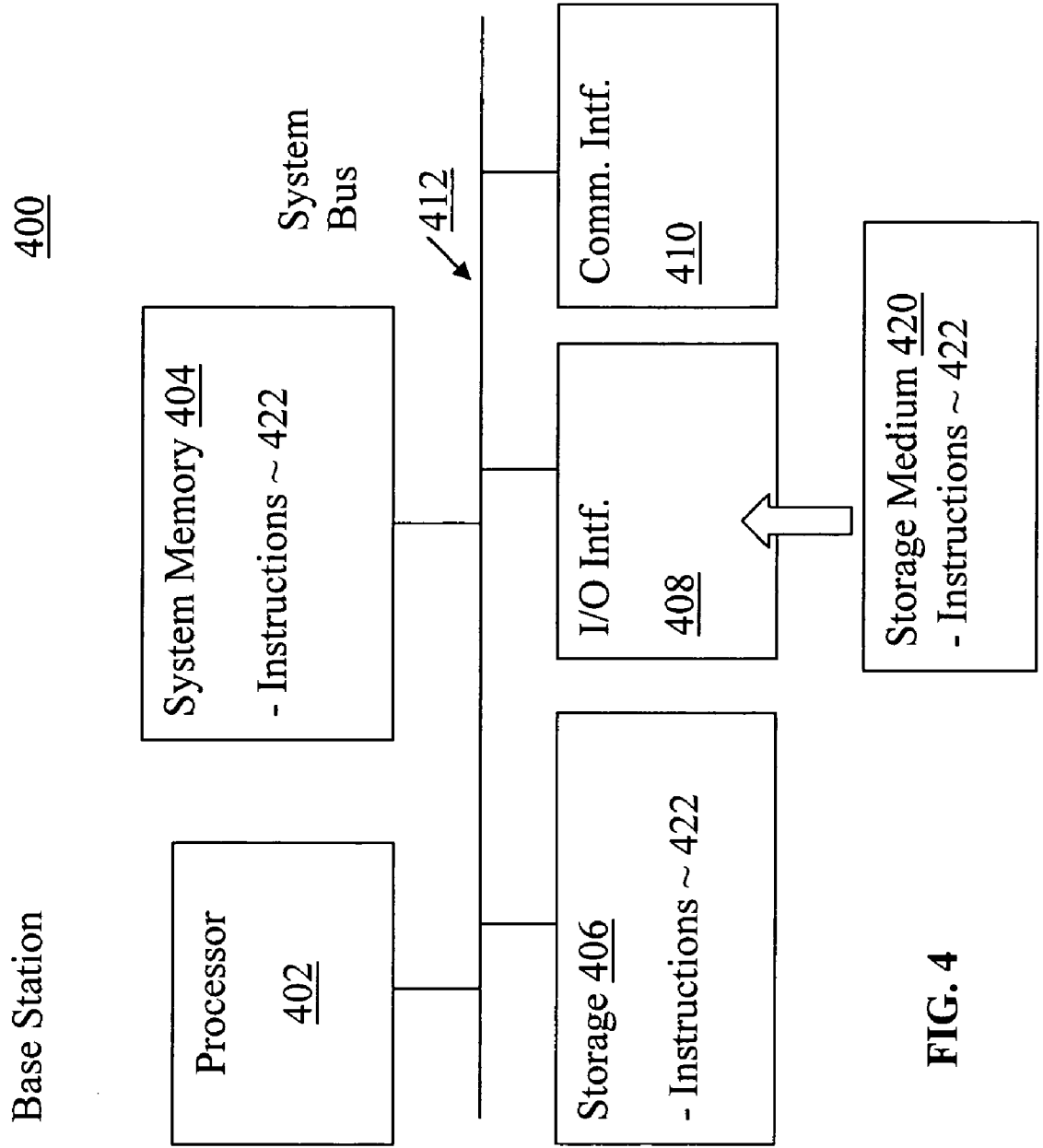
FIG. 4 illustrates a BS of FIG. 1 in further detail, including an article having programming instructions configured to enable the BS to practice an applicable portion of the method of the present invention, in accordance with various embodiments.

FIG. 4 illustrates an example computing device suitable for use as a BS, to practice the present invention, in accordance with various embodiments. The term "computing device" as used herein includes special as well as general purpose processor based computing devices. As shown, computing device 400 includes one or more processors 402 and system memory 404. Additionally, computing device 400 includes persistent storage 406, I/O device interfaces 408 and communication interfaces 410. In various embodiments, I/O device interfaces 408 may include a storage medium reader, and communication interface 410 may include one or more omnidirectional antennas.

The elements are coupled to each other via system bus 412, which represents one or more buses. In the case of multiple buses, they are bridged by one or more bus bridges (not shown). Each of these elements performs its conventional functions known in the art. In particular, system memory 404 and storage 406 are employed to store a working copy of the instructions 422 implementing the above described aggressive AK Context purging logic of BS 104. Instructions 422 may be organized as one or more software units (modules and/or tasks). The software unit or units implementing the applicable logic in each of BS 104 may be referred to as the "authentication module" of BS 104. The permanent copy of the instructions may be loaded into storage 406 in the factory, or in the field, through a distribution medium 420 or through one of communication interfaces 410. The constitution of these elements 402-412 are known, and accordingly will not be further described.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A base station comprising:
   a storage medium to store an authentication key context, including an uplink packet number and a downlink packet number that respectively correspond to a media access control (MAC) message received by the base station from a mobile subscriber station and a downlink MAC message transmitted to the mobile subscriber station from the base station, for an authentication key associated with authenticating the mobile subscriber station to be serviced in a coverage area of an access network serviced by the base station, the mobile subscriber station to be serviced while the authentication key remains unexpired; and
   an authentication module coupled to the storage medium and configured
      to purge the authentication key and the authentication key context of the mobile subscriber station from the storage medium when the base station hands off the mobile subscriber station to be serviced in another coverage area of the access network by another base station and prior to expiration of the authentication key of the mobile subscriber station;
      to receive, subsequent to the authentication key and the authentication key context being purged, a range request MAC message from the mobile subscriber station, the range request MAC message including the authentication key context and being signed with an uplink MAC key derived from the authentication key;
      to retrieve, from an authenticator of the access network, the authentication key based at least in part on the received range request MAC message; and
      to retrieve the authentication key context from the range request MAC message by using the retrieved authentication key to derive the uplink MAC key, wherein the base station is to receive the range request MAC message, retrieve the authentication key, and retrieve the authentication key context when the mobile subscriber station is being handed back to be serviced by the base station.

2. The apparatus of claim 1, wherein the uplink packet number is to uniquely identify an uplink packet from the mobile subscriber station to the base station.

3. The apparatus of claim 1, wherein the downlink packet number is to uniquely identify a downlink packet from the base station to the mobile subscriber station.

4. The apparatus of claim 1, wherein said purging comprises at least one of marking the authentication key context as invalid and marking storage locations of the storage medium employed to store the authentication key context as available for use to store another authentication key context.

5. A method comprising:
   handing off a mobile subscriber station from a first base station to a second base station of an access network;
   purging an authentication key and an authentication key context stored in a storage medium of the first base station on said handing off, the authentication key context, including an uplink packet number and a downlink packet number that respectively correspond to a media access control (MAC) message received by the first base station from the mobile subscriber station and a downlink MAC message transmitted to the mobile subscriber station from the first base station, the authentication key context being associated with an authentication key for authenticating the mobile subscriber station for accessing service of the access network, and the purging is performed even if the authentication key has not expired;
   receiving, subsequent to said purging of the authentication key and the authentication key context, a range request MAC message from the mobile subscriber station, the range request MAC message including the authentication key context and being signed with an uplink MAC key derived from the authentication key;
   retrieving, from an authenticator of the access network, the authentication key based at least in part on the received range request MAC message; and
   retrieving the authentication key context from the range request MAC message by using the retrieved authentication key to derive the uplink MAC key, wherein said receiving the range request MAC message, retrieving the authentication key, and retrieving the authentication key context occurs when the mobile subscriber station is being handed back to the first base station.

6. The method of claim 5, wherein the uplink packet number is to uniquely identify an uplink packet from the mobile subscriber station to the first base station.

7. The method of claim 5, wherein the downlink packet number is to uniquely identify a downlink packet from the first base station to the mobile subscriber station.

8. An article of manufacture comprising: a storage medium; and programming instructions stored in the storage medium and configured to program a base station to enable the base station to store an authentication key context, including an uplink packet number and a downlink packet number that respectively correspond to a media access control (MAC) message received by the base station from a mobile subscriber station and a downlink MAC message transmitted to the mobile subscriber station from the base station, for an authentication key associated with authenticating the mobile subscriber station to be serviced in a coverage area of an access network serviced by the base station, the mobile subscriber station to be serviced while the authentication key remains unexpired;

to purge the authentication key and the authentication key context from a storage medium handing off the mobile subscriber station to be serviced by another base station and prior to expiration of the authentication key;

to receive, subsequent to the authentication key and the authentication key context being purged, a range request MAC message from the mobile subscriber station, the range request MAC message including the authentication key context and being signed with an uplink MAC key derived from the authentication key;

to retrieve, from an authenticator of the access network, the authentication key based at least in part on the received range request MAC message; and to retrieve the authentication key context from the range request MAC message by using the retrieved authentication key to derive the uplink MAC key, wherein the base station is to receive the range request MAC message, retrieve the authentication key, and retrieve the authentication key context when the mobile subscriber station is being handed back to be serviced by the base station.

9. A system comprising:

one or more omnidirectional antennas; and a base station coupled to the one or more omnidirectional antennas, and configured to store an authentication key context, including an uplink packet number and a downlink packet number that respectively correspond to a media access control (MAC) message received by the base station from a mobile subscriber station and a downlink MAC message transmitted to the mobile subscriber station from the base station, for an authentication key associated with authenticating the mobile subscriber station to be serviced in a coverage area of an access network serviced by the base station, the mobile subscriber station to be serviced while the authentication key remains unexpired to purge the authentication key and the authentication key context from a storage medium of the base station when the mobile subscriber station is handed off to another base station to service and prior to expiration of the authentication key;

to receive, subsequent to the authentication key and the authentication key context being purged, a range request MAC message from the mobile subscriber station, the range request MAC message including the authentication key context and being signed with an uplink MAC key derived from the authentication key;

to retrieve, from an authenticator of the access network, the authentication key based at least in part on the received range request MAC message; and to retrieve the authentication key context from the range request MAC message by using the retrieved authentication key to derive the uplink MAC key, wherein the base station is to receive the range request MAC message, retrieve the authentication key, and retrieve the authentication key context when the mobile subscriber station is being handed back to be serviced by the base station.

* * * * *

UNITED STATES PATENT AND TRADEMARK OFFICE
CERTIFICATE OF CORRECTION

PATENT NO. : 7,668,121 B2  Page 1 of 1
APPLICATION NO. : 11/329912
DATED : February 23, 2010
INVENTOR(S) : Sanjay Bakshi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Twenty-eighth Day of December, 2010

David J. Kappos
*Director of the United States Patent and Trademark Office*